No. 880,022. PATENTED FEB. 25, 1908.
H. HALBACH.
POTATO GRATER.
APPLICATION FILED FEB. 18, 1907.
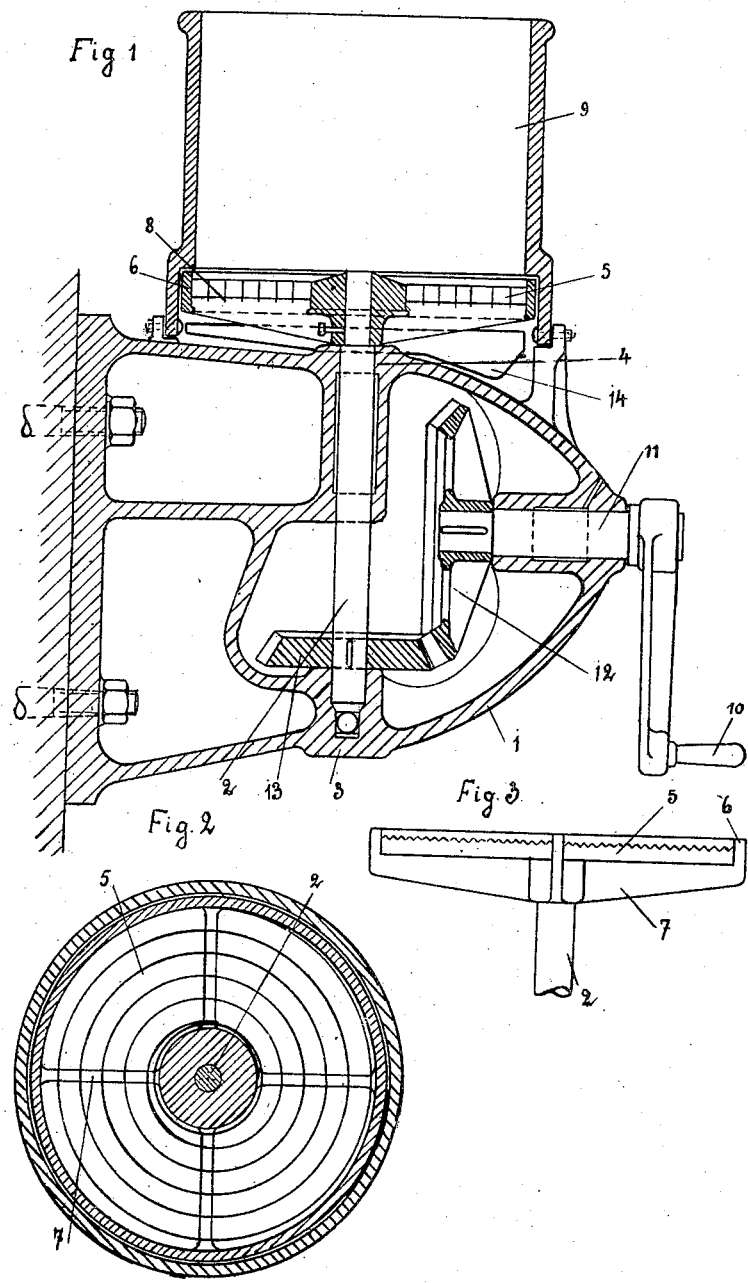

UNITED STATES PATENT OFFICE.

HERMANN HALBACH, OF NEUNKIRCHEN, GERMANY.

POTATO-GRATER.

No. 880,022.  Specification of Letters Patent.  Patented Feb. 25, 1908.

Application filed February 18, 1907. Serial No. 358,150.

*To all whom it may concern:*

Be it known that I, HERMANN HALBACH, painter, a subject of the German Emperor, and resident of Neunkirchen, district Siegen, Germany, have invented an Improved Potato-Grater, of which the following is a specification.

The present invention is in the form of a potato grater, the grating apparatus of which is provided with a coiled saw-blade of spiral shape, a certain amount of free space remaining between the spirals for the passage of the vegetables.

The accompanying drawings are a representation of the invention, Figure 1 being a vertical section of the potato grater. Fig. 2 a plan of the grating apparatus. Fig. 3 an elevation of the same.

In the case 1, a vertical shaft 2 is seated in ball-bearings 3 below and in the guide 4 above. The grating apparatus is mounted on to the shaft 2, a saw-blade 5 being situated in a crown 6 carried by four arms 7 attached to the said shaft 2. The arms 7 are furnished with notches arranged spirally so as to give the required spiral shape to the saw-blade 5.

The vegetables to be grated are placed in a receptacle 9 from where they are carried to the discharging place 14 by means of the grating apparatus. The grating apparatus revolves by means of the crank 10 which transmits, by means of shaft 11 and a bevel wheel 12, the rotary movement to the bevel wheel 13 and thus to the shaft 2.

The working of this potato grater is most excellent the same being of incalculable value for the household as well as for agrarian purposes, as turnips and the like may also be quickly reduced to a pulp in the same.

Having fully described my invention, what I claim and desire to secure by Letters Patent is:

A potato grater, comprising in combination, a vertical shaft, four arms provided with notches attached to the shaft, a crown supported by the arms, a spiral saw blade with a free space between the coils situated inside the crown, notches in the arms to give the required spiral shape to the saw blade, and free space between the spirals of the saw blade to allow the passage of the vegetables, substantially as described and shown and for the purpose set forth.

In testimony whereof I have hereunto set my hand in the presence of two subscribing witnesses.

HERMANN HALBACH.

Witnesses:
 BESSIE F. DUNLAP,
 LOUIS VANDORN.